(12) United States Patent
Wang et al.

(10) Patent No.: US 11,249,581 B2
(45) Date of Patent: Feb. 15, 2022

(54) TOUCH CONTROL STRUCTURE, TOUCH CONTROL METHOD AND TOUCH CONTROL DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Qi Wang, Beijing (CN); Tingting Wang, Beijing (CN); Bo Zhou, Beijing (CN); Yongzhi Song, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 338 days.

(21) Appl. No.: 16/605,197

(22) PCT Filed: Apr. 30, 2019

(86) PCT No.: PCT/CN2019/085258
§ 371 (c)(1),
(2) Date: Oct. 14, 2019

(87) PCT Pub. No.: WO2019/242412
PCT Pub. Date: Dec. 26, 2019

(65) Prior Publication Data
US 2021/0357066 A1    Nov. 18, 2021

(30) Foreign Application Priority Data
Jun. 22, 2018   (CN) .......................... 201810659040.5

(51) Int. Cl.
G06F 3/041    (2006.01)
G06F 3/044    (2006.01)
B60R 11/02    (2006.01)

(52) U.S. Cl.
CPC .......... *G06F 3/0416* (2013.01); *G06F 3/0443* (2019.05); *B60R 11/0258* (2013.01); *B60R 2300/20* (2013.01); *G06F 3/0412* (2013.01)

(58) Field of Classification Search
CPC .... G06F 3/0412; G06F 3/0416; G06F 3/0443; B60R 11/0258; B60R 2300/20
See application file for complete search history.

(56) References Cited

U.S. PATENT DOCUMENTS 9,121,306 B2 *  9/2015  Aizenberg ............ F28F 13/185
9,121,307 B2    9/2015  Aizenberg et al.
(Continued)

FOREIGN PATENT DOCUMENTS

CN    102059161 A    5/2011
CN    103649240 A    3/2014
(Continued)

OTHER PUBLICATIONS

First Chinese Office Action dated Mar. 23, 2020, received for corresponding Chinese Application No. 201810659040.5, 29 pages.
(Continued)

*Primary Examiner* — Ryan A Lubit
(74) *Attorney, Agent, or Firm* — Kinney & Lange, P.A.

(57) ABSTRACT

Provided are a touch control structure, a touch control method and a touch control device. The touch control structure includes: a touch control layer; an electrode layer disposed on the touch control layer; and a dielectric material layer disposed on a side of the electrode layer away from the touch control layer, wherein the dielectric material layer has a lipophilicity variable with a voltage applied by the electrode layer.

20 Claims, 3 Drawing Sheets

(56) References Cited

U.S. PATENT DOCUMENTS

| | | | |
|---|---|---|---|
| 9,353,646 | B2 | 5/2016 | Aizenberg et al. |
| 9,708,199 | B2 | 7/2017 | Zhang et al. |
| 9,932,482 | B2 | 4/2018 | Aizenberg et al. |
| 10,233,334 | B2 | 3/2019 | Aizenberg et al. |
| 10,307,716 | B2 | 6/2019 | Zhang et al. |
| 2013/0264287 | A1 | 10/2013 | Zhang et al. |
| 2015/0160452 | A1* | 6/2015 | Aridomi ............ C08F 283/124 359/290 |
| 2016/0047954 | A1* | 2/2016 | Wang ................. G02B 26/004 359/573 |
| 2016/0259473 | A1* | 9/2016 | Kim .................. G01N 33/0001 |
| 2017/0326504 | A1 | 11/2017 | Zhang et al. |
| 2017/0369664 | A1* | 12/2017 | Brown .................... C08J 7/065 |

FOREIGN PATENT DOCUMENTS

| | | | |
|---|---|---|---|
| CN | 103945924 | A | 7/2014 |
| CN | 104261342 | A | 1/2015 |
| CN | 105045451 | A | 11/2015 |
| CN | 105487738 | A | 4/2016 |
| CN | 105784254 | A | 7/2016 |
| CN | 106569637 | A | 4/2017 |
| CN | 107329639 | A | 11/2017 |
| CN | 107562300 | A | 1/2018 |
| CN | 107861659 | A | 3/2018 |
| CN | 108845698 | A | 11/2018 |

OTHER PUBLICATIONS

Printing and Packaging Functional Materials, Li Lu Hai (2013), pp. 177-178, 10 pages.

* cited by examiner

TOUCH CONTROL STRUCTURE, TOUCH CONTROL METHOD AND TOUCH CONTROL DEVICE

CROSS REFERENCE TO RELATED APPLICATIONS

The present application is the national phase of PCT Application No. PCT/CN2019/085258 filed on Apr. 30, 2019, which in turn claims priority to Chinese Patent Application No. 201810659040.5, filed on Jun. 22, 2018, with a title of "Touch control structure, touch control method and touch control device", the entirety of which is incorporated herein by reference.

TECHNICAL FIELD

The present disclosure relates to the field of touch control. In particular, the present disclosure relates to a touch control structure, a touch control method and a touch control device.

BACKGROUND

Currently, anti-fingerprint touch panels in the market develop in two opposite directions, i.e., applying a lipophobic film or a lipophilic film on a surface of the touch panel. The lipophobic film can reduce grease remained when a finger leaves the touch panel, so as to achieve an anti-fingerprint effect, while the lipophilic film allows grease to spread out on the surface of the touch panel, so as to reduce interference of a fingerprint on displaying.

SUMMARY

In one aspect, the present disclosure provides a touch control structure comprising:
a touch control layer;
an electrode layer disposed on the touch control layer; and
a dielectric material layer disposed on a side of the electrode layer away from the touch control layer,
wherein the dielectric material layer has a lipophilicity variable with a voltage applied by the electrode layer.

In an embodiment of the present disclosure, the lipophilicity of a voltage-applied portion of the dielectric material layer decreases.

In another embodiment of the present disclosure, a voltage-applied portion of the dielectric material layer changes from lipophilic to lipophobic.

In an embodiment of the present disclosure, the dielectric material layer has a lipophilicity which reversibly changes in response to applying of a voltage and stopping of applying the voltage.

In another embodiment of the present disclosure, a dielectric material for the dielectric material layer is one or a mixture of two or more selected from polydimethylsiloxane, poly-p-xylylene, poly(vinylidene chloride-co-trifluoroethylene), amorphous fluororesin, or polytetrafluoroethylene.

In another embodiment of the present disclosure, the dielectric material is polytetrafluoroethylene.

In another embodiment of the present disclosure, the dielectric material layer has a thickness of 100 µm to 1 mm.

In another embodiment of the present disclosure, the dielectric material layer is transparent.

In another embodiment of the present disclosure, the electrode layer is patterned.

In another embodiment of the present disclosure, a material for the electrode layer is selected from a transparent metal or a transparent conductive metal oxide.

In another embodiment of the present disclosure, a material for the electrode layer is one or a mixture of two or more selected from silver, indium tin oxide, tin oxide, or indium oxide.

In another embodiment of the present disclosure, the electrode layer is an electrode layer of indium tin oxide.

In another embodiment of the present disclosure, the touch control structure further comprises a control circuit electrically connected to the touch control layer and the electrode layer respectively, wherein the control circuit controls the electrode layer to apply a voltage to the dielectric material layer.

In another embodiment of the present disclosure, the control circuit applies a voltage to the dielectric material layer at a touch position through the electrode layer, in response to a touch sensing signal received from the touch control layer; and
the control circuit stops applying of the voltage to the dielectric material layer at the touch position, in response to that no touch sensing signal is received any longer.

In another aspect, the present disclosure provides a touch control method based on a touch control structure, the touch control structure comprising: a touch control layer; an electrode layer disposed on the touch control layer; a dielectric material layer disposed on a side of the electrode layer away from the touch control layer; and a control circuit electrically connected to the touch control layer and the electrode layer respectively,
the touch control method comprising:
in a case where the control circuit receives a touch sensing signal from the touch control layer, applying a voltage to the dielectric material layer through the electrode layer, such that the lipophilicity of the dielectric material layer changes; and
in a case where the control circuit does not receive the touch sensing signal any longer, stopping the applying of the voltage to the dielectric material layer, such that the lipophilicity of the dielectric material layer restores.

In an embodiment of the present disclosure, the voltage is applied to the dielectric material layer through the electrode layer to decrease the lipophilicity of a voltage-applied portion of the dielectric material layer.

In an embodiment of the present disclosure, the voltage is applied to the dielectric material layer through the electrode layer to change a voltage-applied portion of the dielectric material layer from lipophilic to lipophobic.

In another embodiment of the present disclosure, the method further comprises:
applying a touch control driving signal to the touch control layer through the control circuit, and receiving a touch sensing signal from the touch control layer; and
identifying the touch position according to the touch sensing signal,
wherein the applying of the voltage to the dielectric material layer through the electrode layer comprises:
applying the voltage to the dielectric material layer at the touch position through the electrode layer.

In yet another aspect, the present disclosure provides a touch control device comprising any one of the touch control structures as described above.

In an embodiment of the present disclosure, the touch control device comprises at least one of a mobile phone, a tablet computer, an ATM, a ticket vendor, or a vehicle navigation system.

BRIEF DESCRIPTION OF DRAWINGS

To more clearly illustrate the technical solutions in embodiments of the present disclosure, the drawings to be used in the description of the embodiments will be briefly introduced below. Obviously, the drawings in the following description are only some exemplary embodiments of the present disclosure, and other drawings can be obtained by those skilled in the art according to these drawings without inventive efforts.

DETAILED DESCRIPTION

The technical solutions in embodiments of the present disclosure will be detailedly described below with reference to particular embodiments of the present disclosure. Obviously, the embodiments and/or examples described are only a part of, not all of the embodiments and/or examples of the present disclosure. All of other embodiments and/or all of other examples obtained by those skilled in the art based on the embodiments and/or examples described, without inventive efforts, fall within the protection scope of the present disclosure.

In the present disclosure, the terms "layer", "membrane", and "film" can be used interchangeably unless specified otherwise. In the present disclosure, all numerical features refers to values within a measuring error range, for example, within ±10%, ±5%, or ±1% of the values as defined. The term "touch control" sometimes can also be referred to as "touch".

As described above, in order to reduce grease remained when a finger leaves a touch panel to achieve an object of reducing influence of a fingerprint on displaying, a lipophobic film is coated on a surface of the touch panel. However, the lipophobic film used can only reduce grease remained on the surface of the touch panel, but cannot prevent grease from remaining on the surface of the touch panel. In addition, because of the lipophobicity of the lipophobic film, the grease remained agglomerates into a sphere on the touch panel, functioning as a magnifier to bend a light output from the screen. Furthermore, because a refractive index of the grease remained is significantly different from that of the substrate used such as a glass substrate, remained fingerprint (grease) is very apparent on the surface of the touch panel, thereby interfering the sight line and influencing the use effect. In addition, a lipophilic film can allow grease to spread out on the surface of a touch panel to reduce interference of a fingerprint on displaying, but cannot reduce grease remained on the surface of the touch panel.

The present disclosure provides a touch control structure, a touch control method based on the touch control structure, and a touch control device comprising the touch control structure, wherein the touch control structure can have advantages of both a lipophilic film and a lipophobic film, that is, it can both reduce grease remained and allow grease remained to spread out on the surface of the touch control structure, thereby achieving a more excellent anti-fingerprint effect.

In one aspect, the present disclosure may provide a touch control structure comprising:

a touch control layer;

an electrode layer disposed on the touch control layer; and a dielectric material layer disposed on a side of the electrode layer away from the touch control layer, wherein the dielectric material layer is configured such that a lipophilicity of the dielectric material layer changes under an action of a voltage applied by the electrode layer.

Figure 1:
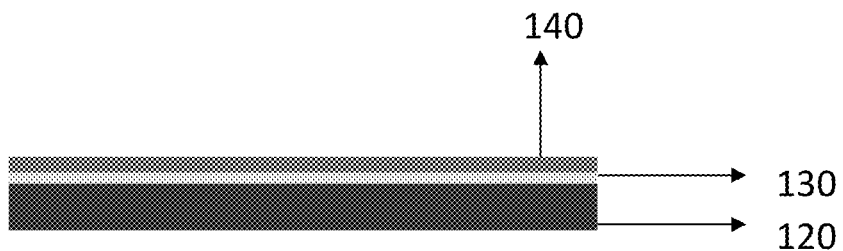
FIG. 1 is a schematic diagram illustrating a touch control structure according to an embodiment of the present disclosure.

FIG. 1 is a schematic diagram illustrating a touch control structure according to an embodiment of the present disclosure.

As shown in FIG. 1, the touch control structure according to an embodiment of the present disclosure may comprise: a touch control layer 120; an electrode layer 130 disposed on the touch control layer 120; and a dielectric material layer 140 disposed on a side of the electrode layer 130 away from the touch control layer 120.

The dielectric material layer 140 may be configured such that it is a lipophilic layer (a layer having lipophilicity) when no voltage is applied, and the lipophilicity of the dielectric material layer 140 changes under an action of a voltage applied by the electrode layer 130, for example, it is possible that the lipophilicity of a voltage-applied portion thereof changes, for example, the lipophilicity thereof decreases, or the voltage-applied portion changes from lipophilic to lipophobic.

There may be an insulating layer between the touch control layer 120 and the electrode layer 130.

Generally, the lipophilicity of an object may be expressed as a contact angle less than 90° between the object and grease. The lipophobicity of an object may be expressed as a contact angle greater than 90° between the object and grease.

In the present disclosure, grease may refer to grease carried by a finger contacting the touch control structure.

A dielectric material for the dielectric material layer 140 may be a transparent material, and may be one or a mixture of two or more selected from polydimethylsiloxane, poly-p-xylylene, poly(vinylidene chloride-co-trifluoroethylene), amorphous fluororesin, or polytetrafluoroethylene. For example, the dielectric material may be polytetrafluoroethylene. The dielectric material layer 140 may have a thickness of 100 μm to 1 mm.

A material for the electrode layer 130 may be selected from a transparent metal or a transparent conductive metal oxide. For example, the material for the electrode layer 130 is one or a mixture of two or more selected from silver, indium tin oxide, tin oxide, or indium oxide. For example, the electrode layer 130 may be an electrode layer of indium tin oxide.

The electrode layer 130 may apply a voltage to the entire dielectric material layer 140, or may apply a voltage to a portion of the dielectric material layer 140, for example, only to the dielectric material layer 140 at a touch position.

The electrode layer 130 may be integral to apply a voltage to the entire dielectric material layer 140.

The electrode layer 130 may be patterned, for example, may be patterned to an array layer of micro-electrodes having the same size as a pixel, to apply a voltage to a portion of the dielectric material layer 140, for example, only to the dielectric material layer 140 at a touch position.

Figure 5:
FIG. 5 is a schematic diagram illustrating a touch control structure according to another embodiment of the present disclosure.

As shown in FIG. 5, the touch control structure may further comprise a control circuit 160. The control circuit 160 is electrically connected to the touch control layer 120 and the electrode layer 130 respectively. The control circuit 160 may be configured to apply a voltage to the dielectric material layer 140 at a touch position through the electrode layer 130 in response to a touch sensing signal received from the touch control layer 120, and to stop the applying of the voltage to the dielectric material layer 140 at the touch position in response to that no touch sensing signal is received any longer. The control circuit 160 may apply a touch control driving signal to the touch control layer 120 and receive a touch sensing signal from the touch control layer 120; and identify the touch position according to the touch sensing signal.

The voltage applied through the electrode layer 130 to the dielectric material layer 140 at the touch position forms a voltage difference with the finger, which may act on the dielectric material layer 140 to change its lipophilicity, i.e., to change the wettability to grease. When the applying of the voltage to the dielectric material layer 140 at the touch position is stopped, the lipophilicity of the dielectric material layer 140 may restore.

The touch control structure may be a resistive touch control structure, a capacitance-sensing type touch control structure, an infrared touch control structure, or a surface acoustic touch control structure.

The resistive touch control structure and the capacitance-sensing type touch control structure are described as examples.

The resistive touch control structure may comprise a resistance touch control layer. The resistance touch control layer is a multi-layer composite film. For example, it comprises a layer of glass or a hard plastic flat plate as a base layer, a transparent metal oxide conductive layer coated on a surface of the base layer, and a plastic layer, the outer surface of which is subjected to a hardening treatment and is smooth and anti-scratch, for covering the transparent metal oxide conductive layer. The inner surface of the plastic layer is also coated with a coating layer. There are a number of fine (for example, less than 1/1000 inch) transparent separation dots between the transparent metal oxide conductive layer and the inner surface of the plastic layer to separate these two conductive layers from each other. When a finger touches a surface touch control area of the touch control structure, two conductive layers contact with each other at the position of the touch point and the resistance changes, thereby producing a signal, which is then transmitted to the control circuit. The control circuit detects such a contact, calculates the position of the touch point, and then operates in a cursor simulating manner. This is the most basic principle for a resistive touch panel. Thus, the resistive touch panel may be operated with a relatively hard object. The resistive touch control structure useful in the present disclosure may comprise a four-wire touch control layer, a five-wire touch control layer, a seven-wire touch control layer, or an eight-wire touch control layer.

The capacitive touch control structure works by utilizing human body's current inductance. The capacitive touch control structure may comprise a four-layer composite structure on a base substrate such as a glass substrate. The inner surface of the base substrate and the interlayer are each coated with a transparent conductive layer such as an ITO layer, and the outermost layer is a thin protection layer. The transparent conductive coating of the interlayer is used as a working plane, with four electrodes leading out from four corners. The inner transparent conductive layer is a shielding layer for ensuring a good working environment. When a finger touches the touch control structure, the user and the surface of the touch control structure form a coupled capacitor due to the human body's electric field. For a high-frequency current, the capacitor is a direct conductor, and thus the finger draws a very small current from the touch point. Such currents flow out from the four electrodes at the four corners of the touch control structure respectively, and the currents flowing through the four electrodes are proportional to distances between the finger and the four corners. The control circuit obtains the position of the touch point through precisely calculating the proportions of the four currents.

For example, in the case of a capacitive touch control structure, the touch control layer 120 may determine the touch position through a biological micro-capacitance, producing a touch sensing signal, which is then transmitted to the control circuit 160. The control circuit 160 applies a voltage to the dielectric material layer 140 at the touch position through the electrode layer 130.

For example, an array layer of micro-electrodes having the same size as a pixel may be formed by bombarding a target material with a high-energy argon gas to sputter the target material on the touch control layer 120 to form an electrode layer, applying a photoresist on the electrode layer, exposing and etching the photoresist, and may be connected to the control circuit. The dielectric material layer may be applied on the surface of the electrode layer by spin-coating, evaporation, or the like.

According to the present disclosure, when a finger with grease contacts the dielectric material layer 140 of the touch control structure, the control circuit 160 applies a voltage to the dielectric material layer 140 at the touch position through the electrode layer 130 in response to a touch sensing signal received from the touch control layer 120, such that the lipophilicity of the dielectric material layer 140 at the position changes, for example, decreases or changes to lipophobic, and at this time, the grease on the finger surface does not wet the dielectric material layer 140. As the finger moves on the surface of the dielectric material layer 140, the control circuit 160 consistently applies the voltage to the dielectric material layer 140 at touch position through the electrode layer 130, keeping the grease on the finger surface unwetted to the dielectric material layer 140. Once the finger leaves the dielectric material layer 140, the control circuit 160 stops the applying of the voltage to the dielectric material layer 140 at the touch position in response to that no touch sensing signal is received any longer, and the lipophilicity of the voltage-applied portion of the dielectric material layer 140 restores. Because the lipophobicity of the voltage-applied portion of the dielectric material layer 140 increases as compared to the case where no voltage is applied, more grease is taken away, and thus less grease is remained on the surface of the touch control structure, i.e., on the dielectric material layer 140. Once the finger leaves the dielectric material layer 140, no voltage is applied to the dielectric material layer 140 through the electrode layer 130 any longer. At this time, the lipophilicity of the previous voltage-applied portion of the dielectric material layer 140 restores, and thus the grease remained in a small amount can spread out on the surface of the dielectric material layer 140, thereby reducing influence on light propagation.

Therefore, the touch control structure according to the present disclosure can have advantages of both a lipophilic film and a lipophobic film, that is, it can both reduce grease remained and allow grease remained to spread out on the surface of the touch control structure, thereby achieving a more excellent anti-fingerprint effect.

Figure 2:
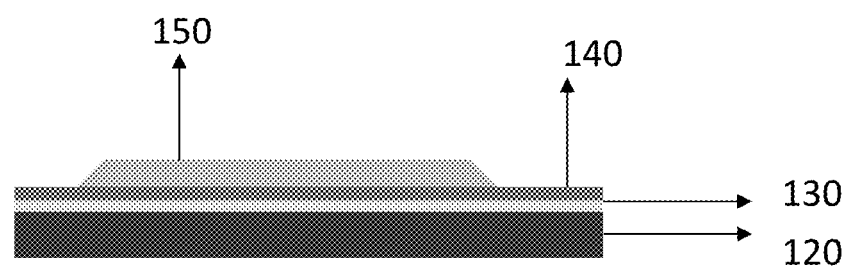
FIG. 2 is a schematic diagram illustrating grease remained on the touch control structure according to an embodiment of the present disclosure after a finger leaves the dielectric material layer.

FIG. 2 is a schematic diagram illustrating grease remained on the touch control structure according to an embodiment of the present disclosure after a finger leaves the dielectric material layer 140. As shown in FIG. 2, the touch control structure may comprise: a touch control layer 120, an electrode layer 130 disposed on the touch control layer 120, and a dielectric material layer 140 disposed on a side of the electrode layer 130 away from the touch control layer 120, in this order. The touch control structure may be any one of the touch control structures as described above. Because the dielectric material layer 140 has a lipophilicity in the case where no voltage is applied, the remained grease 150 can spread out on the surface of the dielectric material layer 140.

Figure 3:
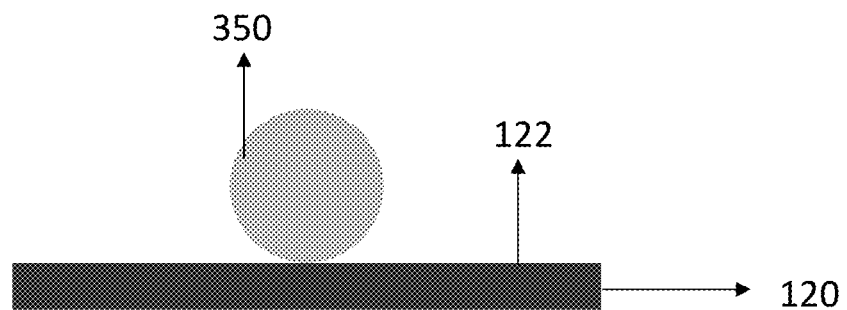
FIG. 3 is a schematic diagram illustrating grease remained on a touch control structure having a lipophobic surface according to related art after a finger leaves the lipophobic surface.

FIG. 3 is a schematic diagram illustrating grease remained on a touch control structure having a lipophobic surface according to related art after a finger leaves the lipophobic surface. As shown in FIG. 3, the touch control structure according to related art may comprise a touch control layer 120. The touch control layer 120 has a lipophobic surface 122. Because of the lipophobicity of the lipophobic surface 122, the remained grease 350 agglomerates into a sphere on the lipophobic surface 122, functioning as a magnifier to bend a light output from the screen. Furthermore, because a refractive index of the remained grease 350 is significantly different from that of the substrate used such as a glass substrate, the remained fingerprint (grease) is very apparent on the surface of the touch control structure, thereby interfering the sight line and influencing the use effect.

In another aspect, the present disclosure may provide a touch control method based on a touch control structure, the touch control structure comprising: a touch control layer; an electrode layer disposed on the touch control layer; a dielectric material layer disposed on a side of the electrode layer away from the touch control layer; and a control circuit electrically connected to the touch control layer and the electrode layer respectively;

the touch control method comprising:

in a case where the control circuit receives a touch sensing signal from the touch control layer, applying a voltage to the dielectric material layer through the electrode layer, such that the lipophilicity of the dielectric material layer changes; and in a case where the control circuit does not receive the touch sensing signal any longer, stopping the applying of the voltage to the dielectric material layer, such that the lipophilicity of the dielectric material layer restores.

In an embodiment of the present disclosure, the voltage may be applied to the dielectric material layer through the electrode layer to decrease the lipophilicity of the dielectric material layer.

In an embodiment of the present disclosure, the voltage may be applied to the dielectric material layer through the electrode layer to change the dielectric material layer from lipophilic to lipophobic.

In an embodiment of the present disclosure, the method may further comprise:

applying a touch control driving signal to the touch control layer through the control circuit, and receiving a touch sensing signal from the touch control layer; and identifying the touch position according to the touch sensing signal, wherein the applying of the voltage to the dielectric material layer through the electrode layer comprises:

applying the voltage to the dielectric material layer at the touch position through the electrode layer.

In yet another aspect, the present disclosure may provide a touch control device comprising a display panel and any one of the touch control structures as described above.

Figure 4:
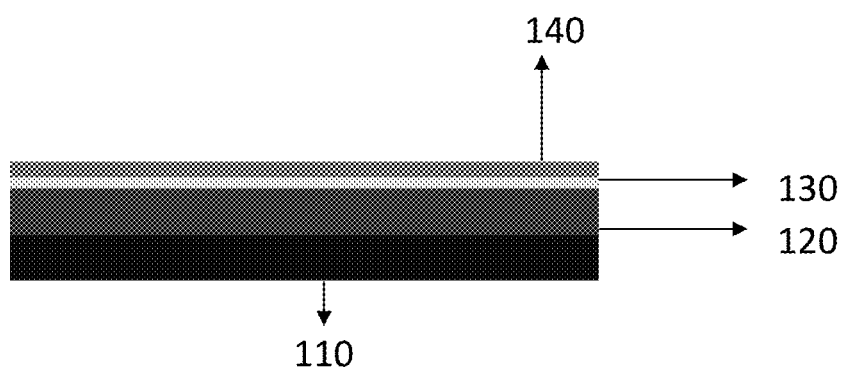
FIG. 4 is a schematic diagram illustrating a touch control device according to an embodiment of the present disclosure.

FIG. 4 is a schematic diagram illustrating a touch control device according to an embodiment of the present disclosure.

As shown in FIG. 4, the touch control device according to an embodiment of the present disclosure may comprise: a display panel 110; and the above-described touch control structure disposed on the display panel 110. The touch control structure may comprise: the above-described touch control layer 120, the above-described electrode layer 130 disposed on the touch control layer 120, and the above-described dielectric material layer 140 disposed on a side of the electrode layer 130 away from the touch control layer 120.

Figure 6:
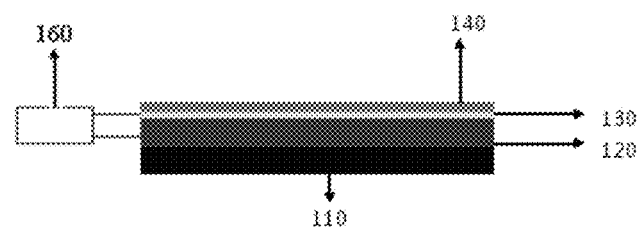
FIG. 6 is a schematic diagram illustrating a touch control device according to another embodiment of the present disclosure.

The touch control device according to an embodiment of the present disclosure may further comprise a control circuit 160 electrically connected to the touch control layer 120 and the electrode layer 130 respectively, as shown in FIG. 6.

The touch control device may be at least one of a mobile phone, a tablet computer, an ATM, a ticket vendor, or a vehicle navigation system. The display panel may be an OLED display panel or a LCD panel. The display panel may also be an AMOLED display panel. The display panel may also be a flexible display panel.

According to the present disclosure, a touch control structure, a touch control method and a touch control device can be provided. When a finger with grease contacts the dielectric material layer of the touch control structure, the control circuit applies a voltage to the dielectric material layer at the touch position through the electrode layer in response to a touch sensing signal received from the touch control layer, such that the lipophilicity of the dielectric material layer at the position changes, for example, decreases or changes to lipophobic, and at this time, the grease on the finger surface does not wet the dielectric material layer. As the finger moves on the surface of the dielectric material layer, the control circuit consistently applies the voltage to the dielectric material layer at touch position through the electrode layer, keeping the grease on the finger surface unwetted to the dielectric material layer. Once the finger leaves the dielectric material layer, the control circuit stops the applying of the voltage to the dielectric material layer at the touch position in response to that no touch sensing signal is received any longer, and the lipophilicity of the previous voltage-applied portion of the dielectric material layer restores. Because the lipophobicity of the voltage-applied portion of the dielectric material layer increases as compared to the case where no voltage is applied, more grease is taken away, and thus less grease is remained on the surface of the touch control structure. Once the finger leaves the dielectric material layer, no voltage is applied to the dielectric material layer through the electrode layer any longer. At this time, the lipophilicity of the dielectric material layer restores, and thus the less grease remained can spread out on the surface of the dielectric material layer, thereby reducing influence on light propagation.

Therefore, the touch control structure according to the present disclosure can have advantages of both a lipophilic film and a lipophobic film, that is, it can both reduce grease remained and allow the grease remained to spread out on the surface of the touch control structure, thereby achieving a more excellent anti-fingerprint effect.

In addition, as described above, the touch control structure with a lipophobic film on the surface thereof can only reduce grease remained on the surface, but cannot prevent grease from remaining on the surface. And because of the lipophobicity of the lipophobic film, the grease remained agglomerates into a sphere on the touch control structure, functioning as a magnifier to bend a light output from the screen. Furthermore, because a refractive index of the grease remained is significantly different from that of the substrate used such as a glass substrate, the remained fingerprint (grease) is very apparent on the surface of the touch control structure, thereby interfering the sight line and influencing the use effect. As compared to the touch control structure with a lipophobic film, the touch control structure according to the present disclosure can reduce grease remained as well, and may further allow the grease remained to spread out on the surface of the dielectric material layer, thereby reducing influence on light propagation and achieving an anti-fingerprint object.

Obviously, modifications and variations on the embodiments of the present disclosure can be made by those skilled in the art without departing from the spirit and scope of the present disclosure. As such, if these modifications and variations fall within the scopes of the claims of the present disclosure or equivalent technologies thereof, the present disclosure is intended to encompass these modifications and variations.

What is claimed is:

1. A touch control structure comprising:
   a touch control layer;
   an electrode layer disposed on the touch control layer; and
   a dielectric material layer disposed on a side of the electrode layer away from the touch control layer,
   wherein the dielectric material layer has a lipophilicity variable with a voltage applied by the electrode layer.

2. The touch control structure according to claim 1, wherein the lipophilicity of a voltage-applied portion of the dielectric material layer decreases.

3. The touch control structure according to claim 1, wherein a voltage-applied portion of the dielectric material layer changes from lipophilic to lipophobic.

4. The touch control structure according to claim 1, wherein the dielectric material layer has a lipophilicity which reversibly changes in response to applying of the voltage and stopping of applying the voltage.

5. The touch control structure according to claim 4, wherein the dielectric material is polytetrafluoroethylene.

6. The touch control structure according to claim 1, wherein a dielectric material for the dielectric material layer is one or a mixture of two or more selected from the group consisting of polydimethylsiloxane, poly-p-xylylene, poly(vinylidene chloride-co-trifluoroethylene), amorphous fluororesin, and polytetrafluoroethylene.

7. The touch control structure according to claim 1, wherein the dielectric material layer has a thickness of 100 μm to 1 mm.

8. The touch control structure according to claim 1, wherein the dielectric material layer is transparent.

9. The touch control structure according to claim 1, wherein the electrode layer is patterned.

10. The touch control structure according to claim 1, wherein a material for the electrode layer is selected from a transparent metal or a transparent conductive metal oxide.

11. The touch control structure according to claim 1, wherein a material for the electrode layer is one or a mixture of two or more selected from the group consisting of silver, indium tin oxide, tin oxide, and indium oxide.

12. The touch control structure according to claim 1, wherein the electrode layer is an electrode layer of indium tin oxide.

13. The touch control structure according to claim 1, further comprising a control circuit electrically connected to the touch control layer and the electrode layer respectively, wherein the control circuit controls the electrode layer to apply the voltage to the dielectric material layer.

14. The touch control structure according to claim 13, wherein the control circuit applies the voltage to the dielectric material layer at a touch position through the electrode layer, in response to a touch sensing signal received from the touch control layer; and
   the control circuit stops applying of the voltage to the dielectric material layer at the touch position, in response to no touch sensing signal being received any longer.

15. A touch control device comprising a display panel and the touch control structure according to claim 1.

16. The touch control device according to claim 15, comprising at least one of a mobile phone, a tablet computer, an ATM, a ticket vendor, or a vehicle navigation system.

17. A touch control method using a touch control structure, the touch control structure comprising: a touch control layer; an electrode layer disposed on the touch control layer; a dielectric material layer disposed on a side of the electrode layer away from the touch control layer; and a control circuit electrically connected to the touch control layer and the electrode layer respectively;
   the touch control method comprising:
      in response to the control circuit receiving a touch sensing signal from the touch control layer, applying a voltage to the dielectric material layer through the electrode layer, such that lipophilicity of the dielectric material layer changes; and
      in response to the control circuit not receiving the touch sensing signal any longer, stopping the applying of the voltage to the dielectric material layer, such that the lipophilicity of the dielectric material layer restores.

18. The touch control method according to claim 17, wherein the voltage is applied to the dielectric material layer through the electrode layer to decrease the lipophilicity of a voltage-applied portion of the dielectric material layer.

19. The touch control method according to claim 17, wherein the voltage is applied to the dielectric material layer through the electrode layer to change a voltage-applied portion of the dielectric material layer from lipophilic to lipophobic.

20. The touch control method according to claim 17, further comprising:
   applying a touch control driving signal to the touch control layer through the control circuit, and receiving a touch sensing signal from the touch control layer; and
   identifying the touch position according to the touch sensing signal,
   wherein the applying of the voltage to the dielectric material layer through the electrode layer comprises:
      applying the voltage to the dielectric material layer at the touch position through the electrode layer.

* * * * *